Nov. 28, 1967
C. FEDERLE ET AL
3,354,904
METERING FAUCET
Filed Oct. 29, 1965
2 Sheets-Sheet 1
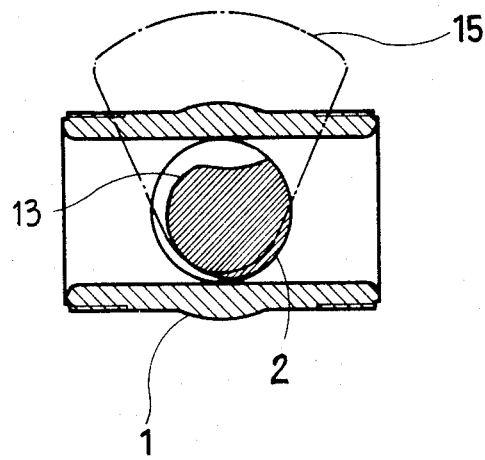
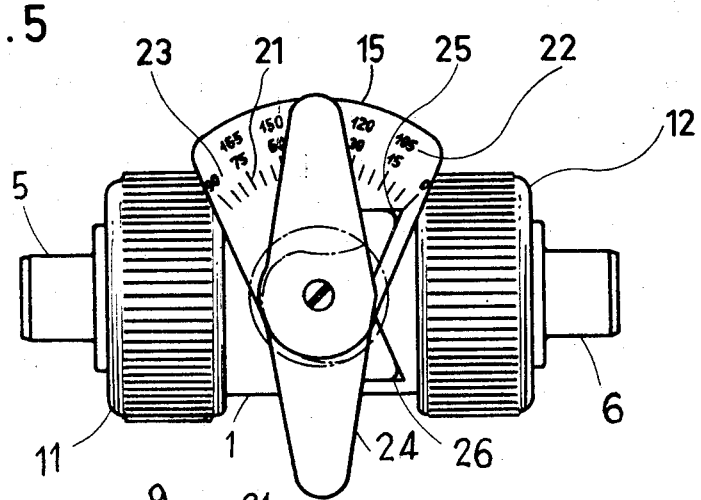
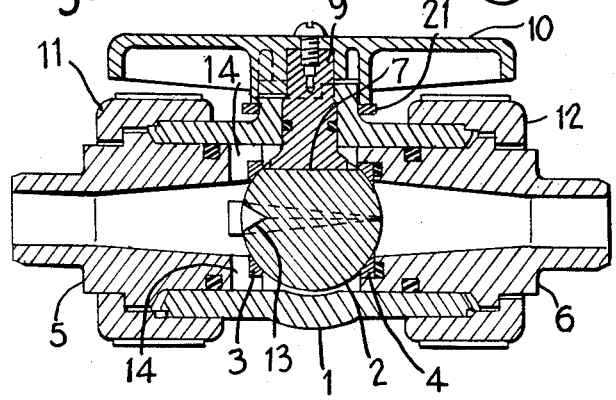
INVENTORS
Carl Federle
Erich Guldener
BY United States Patent Office 3,354,904
Patented Nov. 28, 1967

3,354,904
METERING FAUCET
Carl Federle, Neuhausen, and Erich Guldener, Uhwiesen, Switzerland, assignors to Georg Fischer Aktiengesellschaft, Schaffhausen, Switzerland
Filed Oct. 29, 1965, Ser. No. 505,711
Claims priority, application Switzerland, Nov. 4, 1964, 14,249/64
4 Claims. (Cl. 137—556.6)

ABSTRACT OF THE DISCLOSURE

Ball type valve having a circumferentially grooved ball loosely disposed in a housing with sealing rings seated on opposite sides of the ball and with at least one ring mounted on an insert member adjustable in the housing and with bypass channel means bypassing one sealing ring for conducting at least part of the liquid passing through the valve.

---

The present invention relates to a metering faucet, preferably made of a synthetic material, as for instance polyvinyl chloride or polypropylene.

The invention is based on a design with a cock which in an overhung manner is centered in two sealing strips while at the equatorial circumference of said ball-shaped cock there is provided a notch of varying cross section. Along the axial line of the cock there is provided a groove and a splined shaft for actuating said cock.

Ball-shaped notched cocks have been known heretofore but have the drawback that the notch can affect only 90° of the circumference of the cock whereby the control curve is shortened correspondingly.

Accordingly to another heretofore known embodiment, the cock is rigidly centered on a shaft and a unilaterally sealing edge is formed by an inner ball and an outer ball while the control notch has rectangular side walls. Such a design can be realized in metal only and has the additional drawback that the wear of the sealing edge cannot be made up by corresponding post-adjustment.

It is, therefore, an object of the present invention to provide a metering faucet, preferably of synthetic material, which will overcome the above-mentioned drawbacks.

It is another object of this invention to provide a metering faucet as set forth above, in which the ball-shaped cock is journalled and centered in an overhung manner by two sealing edges or sealing members and has its equatorial ball surface provided with a notch the cross section of which increases from zero to a maximum value.

These and other objects and advantages of the invention will appear more clearly from the following specification in connection with the accompanying drawings, in which:

FIG. 1 is a vertical longitudinal section through a faucet according to the present invention.

FIG. 2 is a longitudinal horizontal section through the housing of the faucet according to the invention with the cock therein.

FIG. 3 also showing a bypass passage in said insert member.

FIG. 5 is a top view of the faucet according to the invention.

Figure 3:
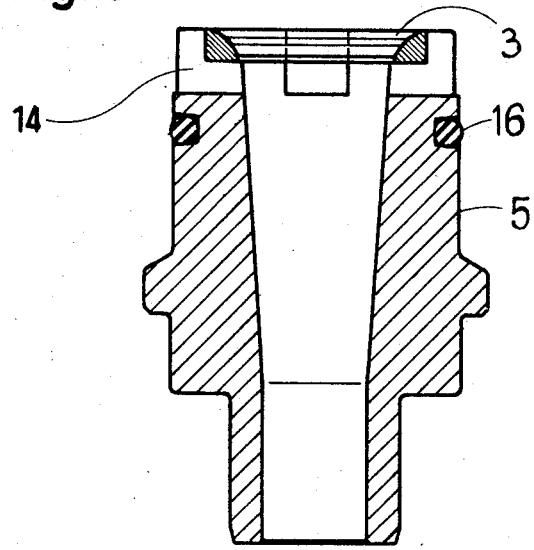
FIG. 3 illustrates on a scale larger than that of FIG. 1 an insert member for insertion into the housing of the faucet.

The present invention is characterized primarily in that the ball cock is in an overhung manner centered between two cylindrical inserts and that one of the inserts behind the sealing and sliding ring is provided with a bypass passage.

More specifically, referring to the drawing in detail, the arangement shown therein comprises a tubular housing 1 with insert members 5 and 6 each of which is provided with a sealing ring 3 and 4, respectively. Arranged between said sealing rings 3 and 4 and centered therebetween is a ball 2 the upper end of which has a groove 7 therein engaged by a wedge-shaped end of a shank 9. Shank 9 has a flattened upper end for receiving a handle 10.

The two insert members 5 and 6 with the sealing rings 3 and 4 therein are clamped relative to each other by means of box nuts 11 and 12. It is, of course, also possible fixedly to connect one of the two insert members with the housing and to make only the other insert member adjustable. The equatorial peripheral portion of ball 2 is provided with a notch 13, which is so designed that its cross-section increases from zero to a maximum value. When developed, the said notch may affect 180° of the circumferential portion of the ball. To this end, behind the sealing edge of ring 3 of the insert member 5 there is arranged one or a plurality of bypass means or channels 14. With this arrangement, the sealing edge of sealing ring 3 merely has the problem of centering the ball 2, whereas the sealing edge of ring 4 is very finely machined and, in cooperation with notch 13, brings about the fine metering. For purposes of improving the sliding properties and reducing the wear, the sealing rings 3 and 4 may consist of polytetrafluorethylene or polyfluorhydrocarbon.

FIG. 2 represents a diagrammatic section of the equatorial plane of ball 2 and shows the precise shape of notch 13, the reference numeral 15 indicating the contour of a dial.

Figure 4:
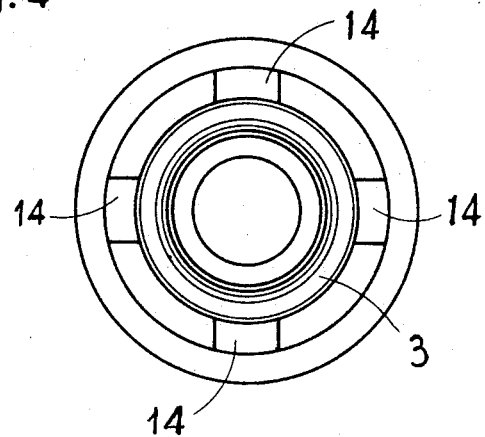
FIG. 4 is a top view of the insert member according to FIG. 3.

FIGS. 3 and 4 illustrate on a larger scale than the preceding figures the insert member 5 with an O-ring seal 16 and the sealing and centering ring 3 of tetrafluorethylene. FIG. 4 shows the bypass passages 14 arranged crosswise with regard to each other and designed as grooves.

According to FIG. 5 showing a top view of the metering faucet, the dial generally designated 15 is provided with two reading lines 22 and 23. The faucet shown in FIG. 5 also shows the handle 24 which is placed on shank 9 and is provided with two fingers or pointers 25 and 26. The fingers or pointers 25 and 26 are offset with regard to each other by 90°. Finger or pointer 25 cooperates with the inner reading line 23 from 0 to 90°, whereas the pointer 26 cooperates with the outer reading line 22 from 90 to 180°. This arrangement has the advantage that the dial can be arranged in a space saving manner between the nuts 11 and 12. For the sake of clarity, the corresponding pointers and dials may respectively be designed in the same color.

The advantages of the present invention consist primarily in the favorable sliding property and wear resistance of the particular structure described above. A wear of the sealing edges can immediately be taken care of by a corresponding adjustment of the sealing rings. The main advantage, however, of the arrangement according to the present invention consists in that the metering notch can be extended over half the circumference of the ball whereby a fine adjustment and metering will be made possible. The design with double pointers makes possible a space saving arrangement of the dial.

It is, of course, to be understood, that the present invention is, by no means, limited to the particular construction shown in the drawings, but also comprises any modifications within the scope of the appended claims.

What we claim is:

1. A metering faucet which includes: a tubular housing, inlet means arranged in one end portion of said housing, outlet means arranged in the other end portion of said housing, at least one of said inlet and outlet means being in the form of an insert member adjustably secured to said housing, first and second coaxial ring means respectively arranged in the inner ends of said inlet and outlet means in spaced parallel relationship to each other while facing each other, a rotatable cock loosely disposed in said housing and provided with a spherical surface and interposed between and engaged by and centered by said first and second ring means, and first and second ring means forming sealing ring means in sealing engagement with said spherical surface, one only of said inlet and outlet means being provided with bypass channel means of substantial area bypassing the respective ring means in said one of said inlet and outlet means and providing a channel through which at least part of the liquid passing through the valve flows, said spherical surface having an area extending circumferentially thereof in about the plane of the axis of said first and second ring means and provided with a groove extending into the surface and around the axis of rotation of said cock and increasing in cross-section from a desired minimum cross-section at one end along the extension of said passage means to a desired maximum cross-section at the other end, the ends of said groove being spaced apart around the ungrooved portion of the cock a distance at least as great as the circumferential extent of the cock exposed inside one of said ring means, and means for rotating said cock in said housing.

2. A metering faucet according to claim 1, in which said channel means extend over an angle of approximately 180° of the circumference of the cock.

3. A metering faucet according to claim 1, in which said bypass channel means is formed by radial groove means in the pertaining inlet and outlet means on that side of the respective adjacent ring means which faces away from said cock, said groove means at one end communicating with the space in the housing between said ring means and at the other end with the flow passage in the pertaining ont of said inlet and outlet means.

4. A metering faucet according to claim 1, which said means for rotating said cock includes handle means moveably connected to said rotatable cock for rotating the same, and dial means connected to said housing and provided with two rows of coextensive markings respectively indicating from 0 to 90° and from 90 to 180°, said handle means being provided with a first pointer for moving over one of the said rows and with a second pointer for moving over the other one of said rows to thereby indicate the angle of rotation of said handle means, said first and second pointers being offset with regard to each other by an angle of approximately 90°.

References Cited

UNITED STATES PATENTS

| | | | |
|---|---|---|---|
| 2,930,576 | 3/1960 | Sanctuary | 251—315 X |
| 2,934,311 | 4/1960 | Sjoholm | 251—209 |
| 3,132,836 | 5/1964 | Dickerson et al. | 251—368 X |
| 3,182,952 | 5/1965 | Montesi | 251—315 X |
| 3,245,655 | 4/1966 | Oetjens | 251—315 |
| 3,269,411 | 8/1966 | Teston | 251—368 X |

FOREIGN PATENTS

| | | |
|---|---|---|
| 937,619 | 10/1948 | France. |
| 965,894 | 6/1957 | Germany. |

M. CARY NELSON, *Primary Examiner.*

W. J. JOHNSON, J. R. DWELLE, *Assistant Examiners.*